F. RICHARD.
CUTTER.
APPLICATION FILED DEC. 15, 1914.
1,243,446.
Patented Oct. 16, 1917.
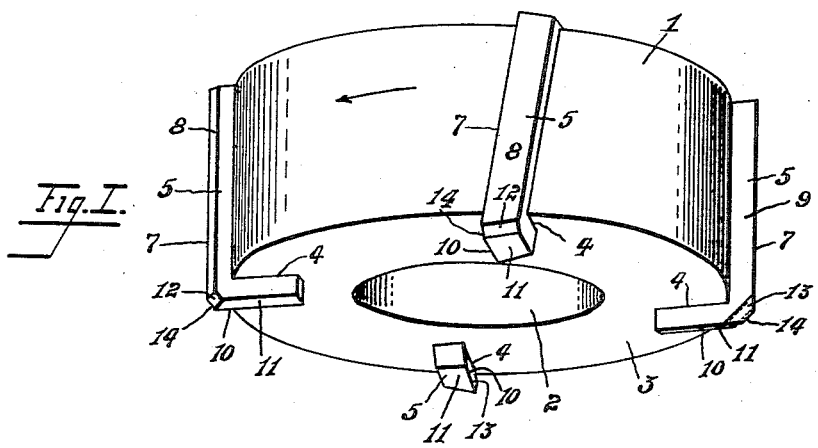
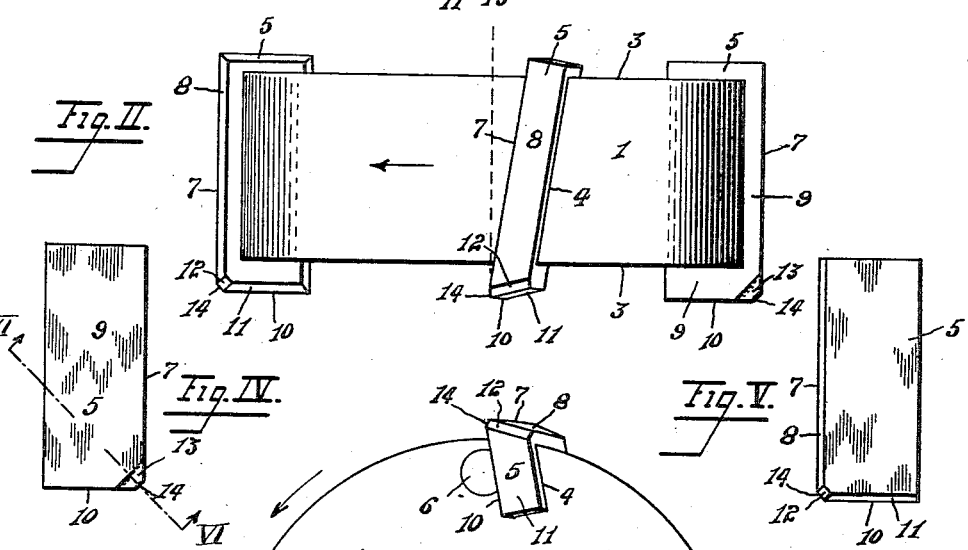
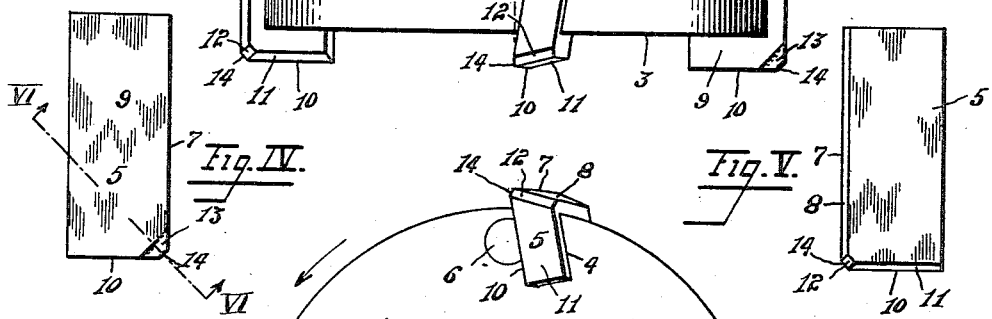
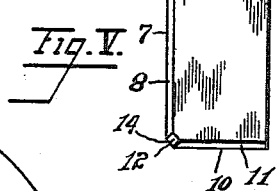
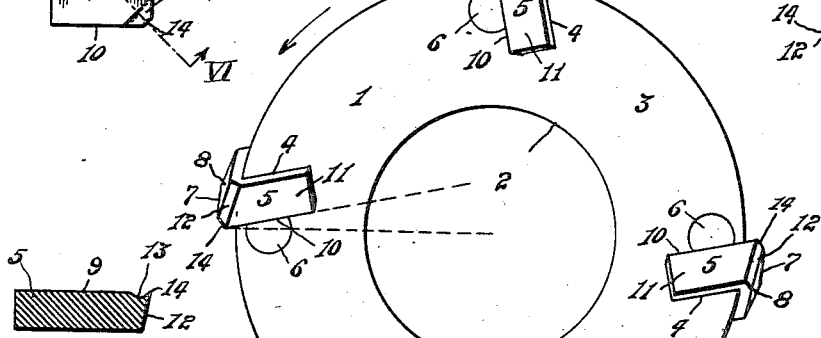
Inventor:
Francois Richard
by his att'y

UNITED STATES PATENT OFFICE.

FRANÇOIS RICHARD, OF CLEVELAND, OHIO, ASSIGNOR TO THE RICHARD AUTO MFG. COMPANY, OF CLEVELAND, OHIO.

CUTTER.

1,243,446.     Specification of Letters Patent.     Patented Oct. 16, 1917.

Application filed December 15, 1914. Serial No. 877,327.

*To all whom it may concern:*

Be it known that I, FRANÇOIS RICHARD, a citizen of the French Republic, residing at Cleveland, in the county of Cuyahoga and State of Ohio, have invented a new and useful Improvement in Cutters, of which the following is a specification, the principle of the invention being herein explained and the best mode in which I have contemplated applying that principle, so as to distinguish it from other inventions.

My invention has general reference to cutters and more particularly to rotary cutters such as are employed for boring, milling, facing, reaming, and end-mill work.

Figure I is a perspective view of a cutter head carrying a number of cutting knives after the manner of my invention.

Fig. II is an end elevation of Fig. I.

Fig. III is a bottom plan of Fig. II.

Fig. IV is a plan of the cutting face of one of the knives.

Fig. V is a rear plan of Fig. IV.

Fig. VI is a section on line VI—VI of Fig. IV.

Directing attention to the several views, a cylindrical cutter head 1, having a spindle hole 2 and flat sides 3 is furthermore provided as is customary, with circumferentially arranged peripheral slots 4 which open through both of the sides 3. The slots 4 not only extend obliquely across the cutter head but are furthermore purposely sloped rearwardly with reference to the proposed direction of rotation of the cutter head as they proceed inwardly.

A corresponding number of knives 5 are seated as a mechanical fit in the slots 4 and held in correct position up and down in the well known manner as with pins 6 passing through suitable openings. As a necessary incident, the outwardly projecting portion of each knife is tilted forwardly as is perhaps most clearly seen at the top of Fig. III. Mention is made that the degree of tilt is quite arbitrary and ordinarily would vary according to the character of work to be performed. Each of the knives is provided with a cutting edge 7 extending across the periphery of the cutterhead and rearwardly of such edge is provided with a beveled outer surface 8 to provide the necessary clearance. The cutting edges 7 are those which are employed for facing, milling, and reaming, but owing to the fact that such cutting edges are more advanced than any other line in the cutting face 9 which extends across the cutterhead, the cuts effected thereby are shearing or proper shaving cuts rather than scraping cuts. Each of the knives 5 is furthermore provided underneath with a cutting edge 10 extending rearwardly with reference to the direction of rotation as well as inwardly whereby if the line of such cutting edges 10 were continued they would subtend arcs less than 180° and such arcs would be rearwardly of the point of intersection of the plane of the cutter face with the periphery of the cutterhead. The under end surface 11 of each of the knives is likewise beveled off to provide necessary clearance. The cutting edges 10 are those which are employed for end mill and boring purposes, but owing to the fact that such cutting edges 10 have their outer portions advanced with reference to their inner portions, the outermost circle of any new cut made thereby is always completed first with the decided advantage that the chips are properly fed away.

It is obvious to any who are thoroughly conversant with this art that during a boring operation, the meeting points of the cutting edges 7 and cutting edges 10 become subject to very severe usage. With this in mind I have cut off those corners which would ordinarily be the junctions of the cutting edges 7 and the cutting edges 10. This I have done at an angle of 45° to form surfaces 12, as seen in Fig. V. It should be understood however, that such angle is by no means necessarily fixed at 45°. The cutting face 9 is fastened just back of the corner surface 12 with a groove 13 as is clearly shown in Figs. IV and VI. The purpose of this groove is to provide a third edge 14 which is necessarily, in accordance with this exemplification, at an angle of $67\frac{1}{2}$ degrees to each of the cutting edges 7 and 10. I have discovered that such an additional cutting edge disposed at various angles to both of the other cutting edges produces a very marked improvement as regards both speed and quality of boring cut.

I claim:

1. A cutter having a pair of angularly disposed cutting edges and a corner cutting edge connecting the others, said knife being fashioned with a groove having one side merging along said corner edge and intersecting said other two edges.

2. A cutter head carrying a forwardly tilted knife having three angularly related cutting edges merging each into another, the cutting face of said knife being fashioned with a groove extending along the middle one of said edges whereby to accentuate the same.

Signed by me, this 11th day of December, 1914.

FRANÇOIS RICHARD.

Attested by—
F. M. BRADY,
C. E. MURDOCK.